G. F. D. TRASK.
HOSE RACK.
APPLICATION FILED JULY 16, 1909.
941,410.
Patented Nov. 30, 1909.
2 SHEETS—SHEET 1.
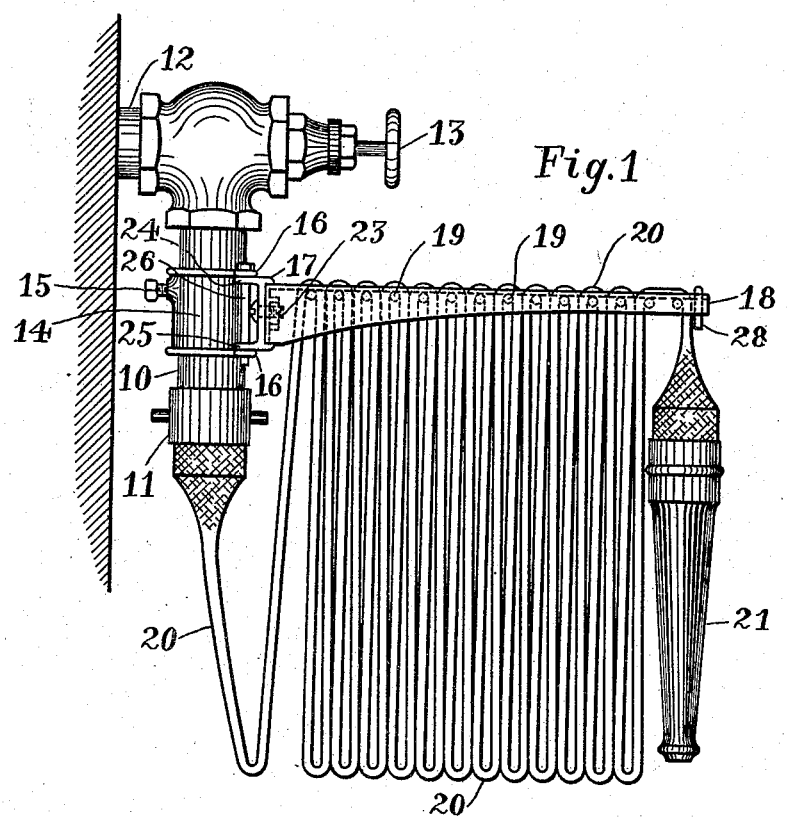
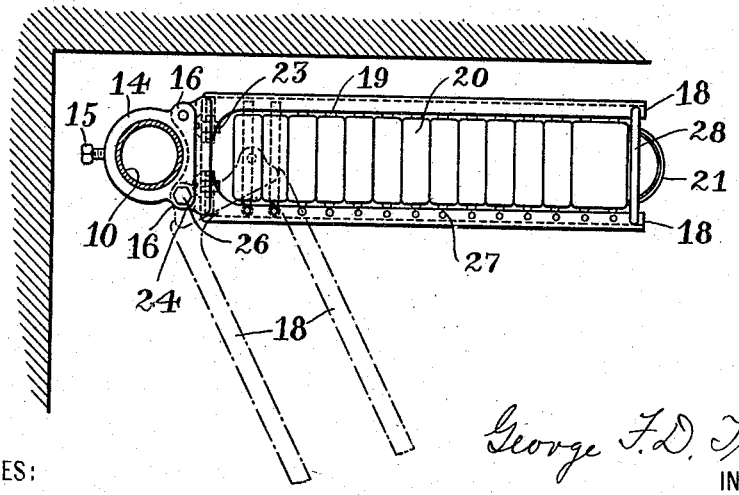
WITNESSES:
George F. D. Trask
INVENTOR
BY J. H. MacKay
ATTORNEY

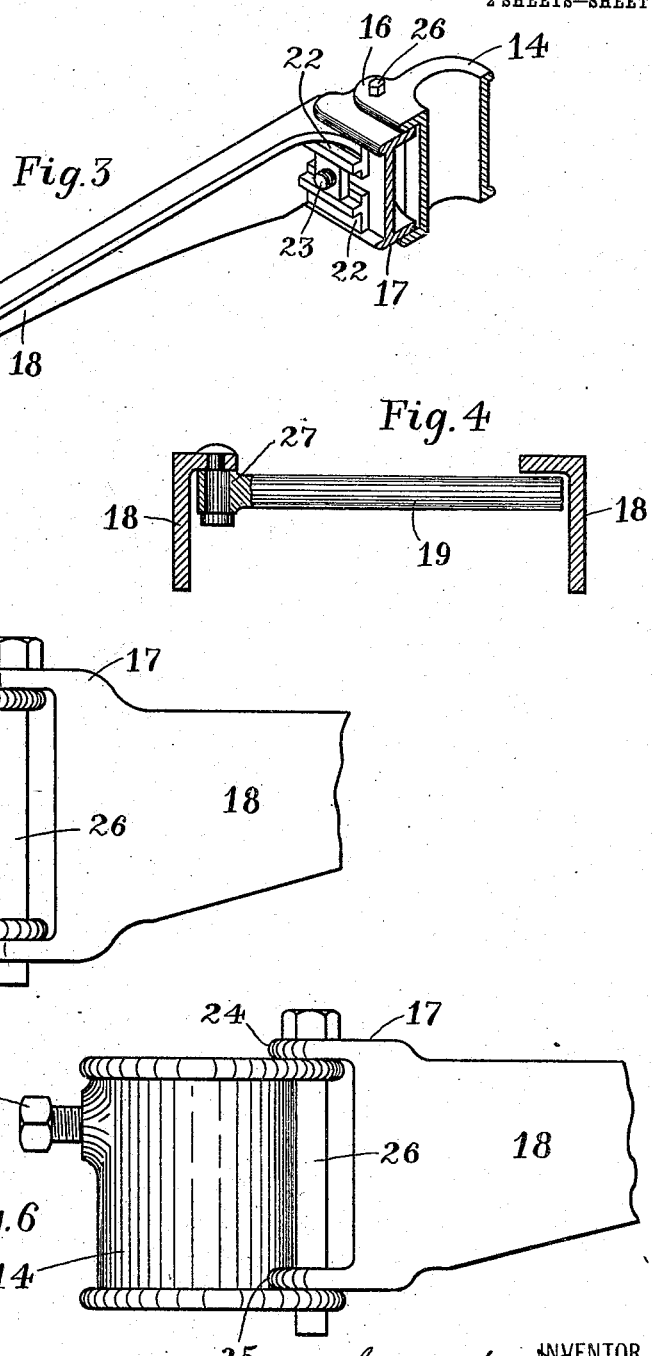

UNITED STATES PATENT OFFICE.

GEORGE F. D. TRASK, OF ORANGE, NEW JERSEY.

HOSE-RACK.

941,410.

Specification of Letters Patent. Patented Nov. 30, 1909.

Application filed July 16, 1909. Serial No. 507,945.

*To all whom it may concern:*

Be it known that I, GEORGE F. D. TRASK, a citizen of the United States, residing in Orange, Essex county, State of New Jersey, have invented a certain new and useful Improvement in Hose-Racks, of which the following is a specification.

This invention has reference to an improved form of rack for carrying fire hose and the principal object of the invention is the provision of a convenient and easily manipulated fire hose rack capable of application directly to the branch pipe or nipple with which the hose connection is made in a compact form which, while permitting the rack to be swung in either direction permitted by the location, is at the same time arranged to economize space.

The rack is particularly adapted for placing in corners or locations where for any reasons the utmost economy of space is desired.

The invention is illustrated in a preferred form in the accompanying drawings wherein—

Figure 1 is a side elevation of one form of the rack, Fig. 2 is a plan view of the same, Fig. 3 is a perspective view of one-half of the rack, Fig. 4 is a sectional end view and Figs. 5 and 6 are side elevations of modified forms of attachment.

As shown in Figs. 1 and 2 my improved hose rack is carried primarily on the short vertical stand pipe or nipple 10 to which the hose coupling 11 is adjusted. The main water pipe is shown at 12 and the hand valve at 13. Upon the stand pipe or nipple 10 the supporting collar 14 is slipped being secured in place by the set screw 15 or its equivalent. This collar 14 is flanged at the top and bottom as shown and these flanges are each supplied with two centrally perforated ears 16.

The movable portion of the hose rack comprises a base 17 from which project horizontally two horizontal arms 18 which support the transverse pins 19 over which the hose 20 is folded in successive bights with the hose nozzle 21 hanging at the extreme outer end.

One form of attachment of the arms 18 to the base is shown in Figs. 1, 2 and 3. In this form the arms 18 are each supplied with brackets 22 which are adapted to slide horizontally against the front face of the base 17 so as to be adjustable with respect to the distance apart of the arms. The arms are fastened in any desired position by means of the bolts 23. This particular form of attachment is not essential however, and in Figs. 5 and 6 I have shown the arms 18 formed integral with the base 17.

The base 17 is made as narrow as possible consistently with proper strength and is placed as close as possible to the supporting collar 14. This is to save as much space as possible which is an important point in many locations.

The base 17 is provided with flanges at the top and bottom as shown at 24 and 25 which are provided with perforated ears so formed and spaced that their perforations may be made to register with perforations in the ears on the collar 14. The entire rack being brought into position shown in Figs. 1 and 2 so that the perforations in the base 17 will register with those in the collar 14, the movable part of the rack is secured to the collar by means of a pin 26 which is adapted to pass through the registering perforations on either side as clearly shown in Fig. 2. In this position it is clear that when it is desired to use the hose the movable part of the rack can be swung around the pin 26 as indicated in dotted lines in Fig. 2.

The pin 26 is made so as to be capable of fitting the perforations on either side of the rack desired and consequently when the rack is installed the supporting pin 26 can be so placed as to adapt the entire device to the peculiar location of the supporting nipple 10.

For instance if the nipple were placed in a corner the arm 18 would be swung so as to normally lie parallel with one of the walls meeting at the corner, while a supporting pin 26 would occupy the perforations on the side away from the wall, and it is therefore clear that the normal location of the arms 18 would be parallel to either wall desired, while at the same time by proper adjustment of the pin 26 the rack would be ready to swing outward into any desired position. At the same time the movable portion of the rack is located as close as possible to the supporting collar and the greatest possible economy of space is effected.

I prefer to arrange the pins 19 over which the hose is folded as shown in Figs. 2 and 4, that is to say each pin pivoted as shown at 27 to a horizontal flange at the top of one of the arms 18, the opposite end of each pin being free. When this arrangement is used and it becomes desirable to use the hose, it is only necessary to with-draw the securing pin 28 and, grasping the nozzle 21, to draw the entire hose directly off of the rack. The pins 19 will automatically swing forward and release the hose.

The flanges 24 and 25 may be given various positions with respect to the flanges on the collar 14. In Fig. 1, for instance, both flanges are inside of the flanges on the collar. In Fig. 5 flange 24 is on top of the collar, while the flange 25 is underneath it. In Fig. 6 the flange 24 is on top of the collar and the flange 25 rests upon the lower flange of the collar 14.

Various changes may be made in this device without departing from the spirit of my invention and I do not limit myself to the details herein shown and described.

What I claim is—

1. A hose rack comprising in combination a supporting collar, a base having two points for attachment at its opposite sides, a hose support projecting from said base and means adaptable to either of the two points of support on the base for pivotally attaching said base to said collar, substantially as described.

2. A hose rack comprising in combination a supporting collar having perforated ears close to the collar, a movable portion provided with perforations adapted to register with the perforations in the collar and a supporting pin adapted to fit the registering perforations on either side of the collar, substantially as described.

3. A hose rack comprising in combination a supporting collar provided with perforated ears close to the collar, means for securing the collar to a standard, a base having perforations adapted to register with the first named perforations, a pin adapted to fit the registering perforations on either side of the collar at will, horizontal supporting arms projecting from said base and transverse pins pivoted each to one of said arms, substantially as described.

GEORGE F. D. TRASK.

Witnesses:
H. S. MacKaye,
M. A. Butler.